United States Patent
Lobsiger et al.

(10) Patent No.: US 6,168,122 B1
(45) Date of Patent: Jan. 2, 2001

(54) CROSS MEMBER MOUNTED CABLE CONTAINMENT DEVICE FOR AVOIDING PROPSHAFT/UNIVERSAL JOINT/CABLE INTERFERENCE

(75) Inventors: James A. Lobsiger; Richard A. Arnold, both of Fort Wayne, IN (US); Gregory S. Didier, Coldwater, MI (US); Michael Stagg, Huntington, IN (US)

(73) Assignee: Navistar International Transportation Corp., Chicago, IL (US)

( * ) Notice: Under 35 U.S.C. 154(b), the term of this patent shall be extended for 0 days.

(21) Appl. No.: 09/023,188

(22) Filed: Feb. 13, 1998

(51) Int. Cl.$^7$ .................................................. F16L 3/22
(52) U.S. Cl. .......................... 248/68.1; 248/49; 174/72 A
(58) Field of Search ............................... 248/58, 61, 68.1, 248/69, 49; 280/782, 783, 797; 174/72 A, 135; 296/208; 307/9.1, 10.1, 147; 180/65.5, 65.8; 361/827, 826

(56) References Cited

U.S. PATENT DOCUMENTS

| | | | |
|---|---|---|---|
| 2,122,988 | * | 7/1938 | Nelson ................................... 248/53 |
| 2,896,009 | * | 7/1959 | Caveney .............................. 174/72 A |
| 3,233,851 | * | 2/1966 | Lemieux et al. ..................... 248/68.1 |
| 3,325,128 | * | 6/1967 | Elleboudt ............................. 248/68.1 |
| 3,761,603 | * | 9/1973 | Hays et al. .......................... 174/72 A |
| 3,836,415 | * | 9/1974 | Hilderbrandt ........................ 156/296 |
| 5,135,187 | * | 8/1992 | Joas et al. .............................. 248/49 |
| 5,215,280 | * | 6/1993 | Tigrett ................................. 248/68.1 |
| 5,442,518 | * | 9/1995 | Beam ............................... 174/72 A X |
| 5,534,665 | * | 7/1996 | Long ................................... 174/72 A |
| 5,811,732 | * | 9/1998 | Beam .................................. 174/72 A |

* cited by examiner

*Primary Examiner*—Leslie A. Braun
*Assistant Examiner*—Gwendolyn Baxter
(74) *Attorney, Agent, or Firm*—Jeffrey P. Calfa; Dennis Kelly Sullivan

(57) ABSTRACT

A cable containment device for supportedly routing cables and air lines along a cross member of a truck frame to eliminate potential interference of the cables and air lines with operating structures beneath the cross member defines an elongate channel having at least a horizontal bottom wall which extends across a major portion of the length of the cross member for providing securely supported elevation of the cables above the operating structures.

7 Claims, 3 Drawing Sheets

CROSS MEMBER MOUNTED CABLE CONTAINMENT DEVICE FOR AVOIDING PROPSHAFT/UNIVERSAL JOINT/CABLE INTERFERENCE

BACKGROUND OF THE INVENTION

The present invention relates to a cable containment device for routing bundled cables along a cross member of a truck frame of a vehicle to eliminate potential interference of the cables with operating structures such as a propshaft and/or universal joint positioned beneath the cross member. More specifically, the device provides an elongate channel extending across a major portion of the length of the cross member within and by which cables to be routed along the length of the cross member may be completely supported at a desired elevation to eliminate the potential of interference between the cables and the operating structures therebeneath.

PRIOR ART

Heretofore, cables or air lines of a truck have been supported by spaced apart clamps engaged to the cross member and positioned to either side of the operating structures.

Such clamp supported cables have been found to sag in the area between the clamps, at times to such an extent as to fall into contact with the operating structures therebeneath, eventually causing destruction of the cables.

It has been proposed to add a centered clamp to the cross member at a position directly above the operating structures, but this has been found to be an unworkable solution because the diameter of the bundle of cables to be engaged has required a clamp so large that consistent avoidance of interference of the clamp with the operating structures therebeneath has not been possible.

SUMMARY OF THE INVENTION

Accordingly, it is a primary object of the invention to provide a device which will accommodate any number of cables bundled together and provide rigid support for the cables to avoid any potential sagging of any of the cables into contact with the underlying operating structures.

The primary object, as well as other objects, is met by the cross member mounted cable containment device of the present invention which defines an elongate channel having at least a horizontal bottom surface supported by and extending substantially across the length of the cross member upon which the device is supported in a manner where the bottom surface of the channel is elevated a predetermined distance above the operating structures therebeneath.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
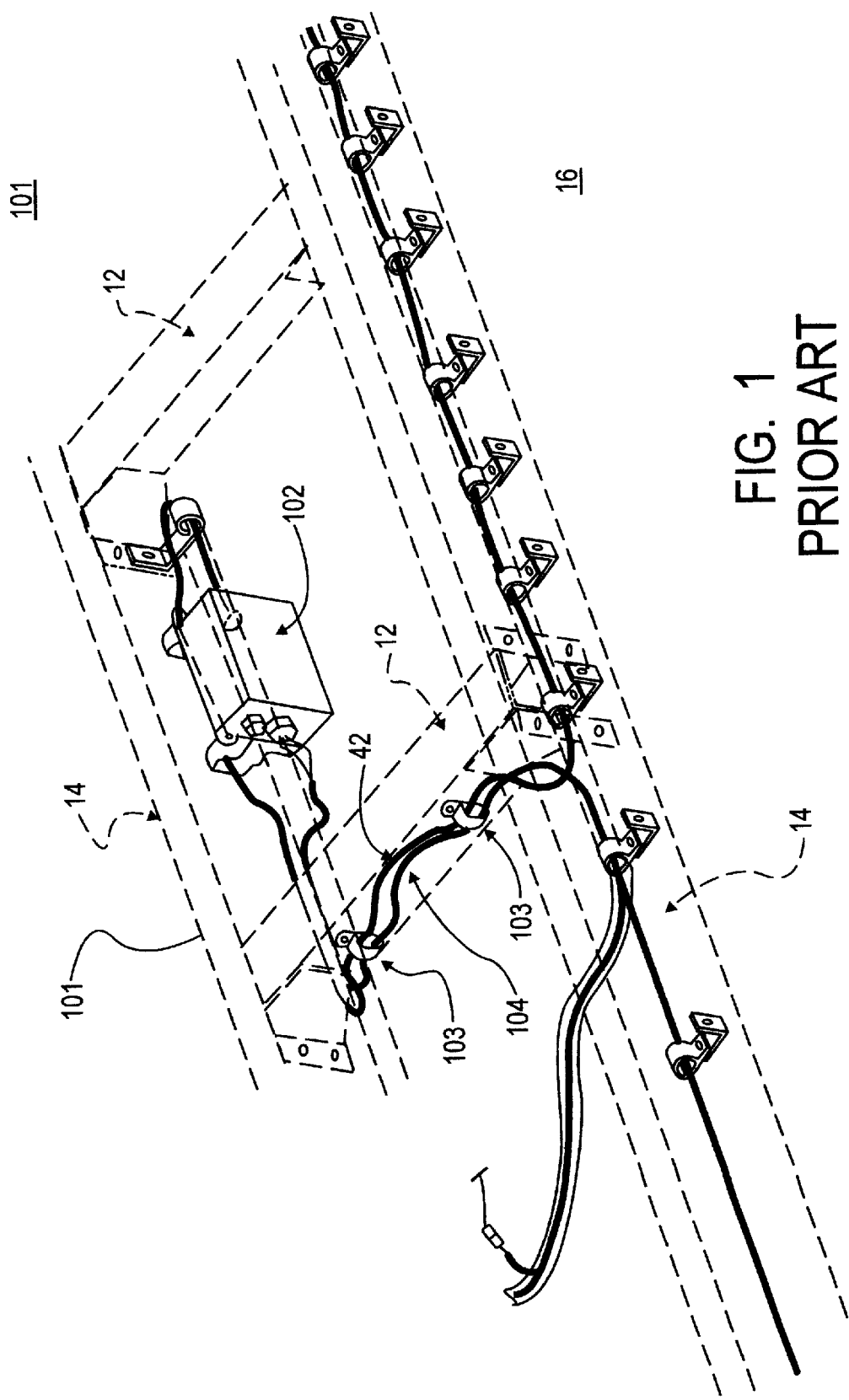
FIG. 1 is a simplified perspective view of frame members of a truck showing prior art use of clamps for engaging bundled cables to a cross member of the truck frame and shows the cables of the bundle sagging in the area between the clips.

Referring now to the drawings in greater detail, in FIG. 1, a portion of a truck vehicle frame 16 including side rails 14 and cross members 12 of a mobile truck vehicle 101 (not shown in entirety) is illustrated. Engaged to one of the side rails 14 is a vehicle component 102, such as a control unit for an antilock brake system of the vehicle 101, which requires pressurized air for functionality, the pressurized air being supplied thereto from a source remotely positioned in a manner requiring an air line 104 therefrom to cross the width of the vehicle 101 along its path to the component. Additionally, cables 42 may need to cross the width of the vehicle 101.

Typically, a pair of spaced apart clips 103 is mounted along the length of a cross member 12 of the vehicle frame 16. Usually such cross member 12 is defined as the cab rear cross member which bridges between side rails 14 of the truck chassis at a position above the rear drive shaft 20 and an universal joint 22 engaged thereto. Through vibrational effects, gravity, road bump effects, etc., cables 42 and air lines 104 extending along the cross member 12 and supported by the clips 103 tend to sag in an area between the clips 103, eventually catching on the drive shaft 20 or universal joint 22, causing breakage of such sagging cables 42 and air lines 104 under the most severe circumstances.

To eliminate such potential sagging of the cables 42 and air lines 104, a cable containment device 10 having at least a bottom surface upon which a bundle of such cables 42 and air lines 104 may be supported is proposed which is fixed to the cross member 12 and lies along at least the area above the driveshaft 20/universal joint 22 at a position elevated above the driveshaft 20 and universal joint 22 of the truck vehicle 101. Such cable containment device 10 is illustrated in FIGS. 2–4.

Figure 2:
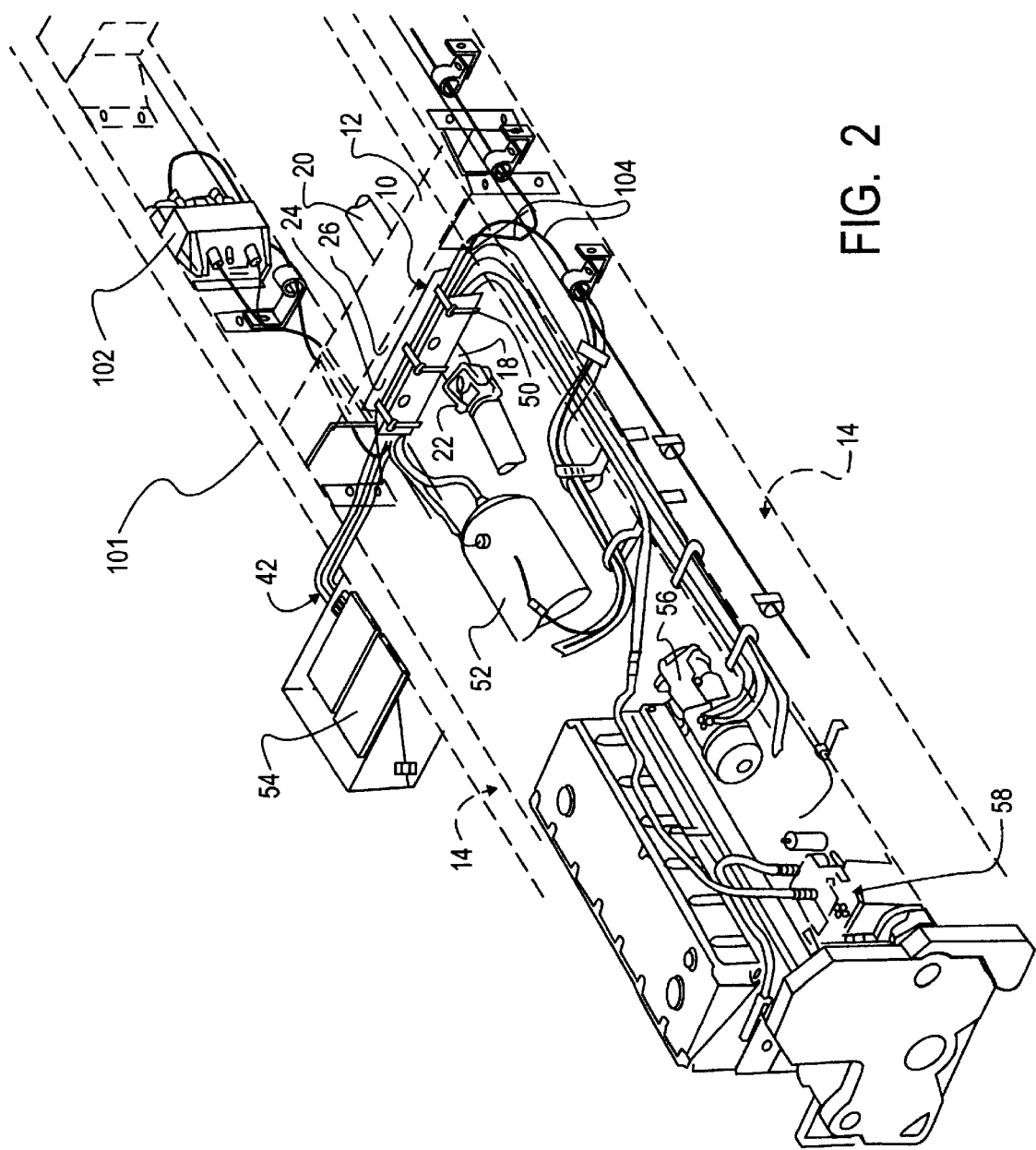
FIG. 2 is a perspective view similar to FIG. 1 and shows the device of the present invention substituted for the clips as well as a detail of components between and to which cables supported by the device must be routed.

As illustrated in detail in FIG. 2 a cross member 12 defined as a cab rear cross member 12 bridges between side rails 14 of a truck frame 16 at a position overlying a forward end 18 of a rear drive shaft 20 and a universal joint 22 engaged to the forward end 18 of the drive shaft 20.

Figure 3:
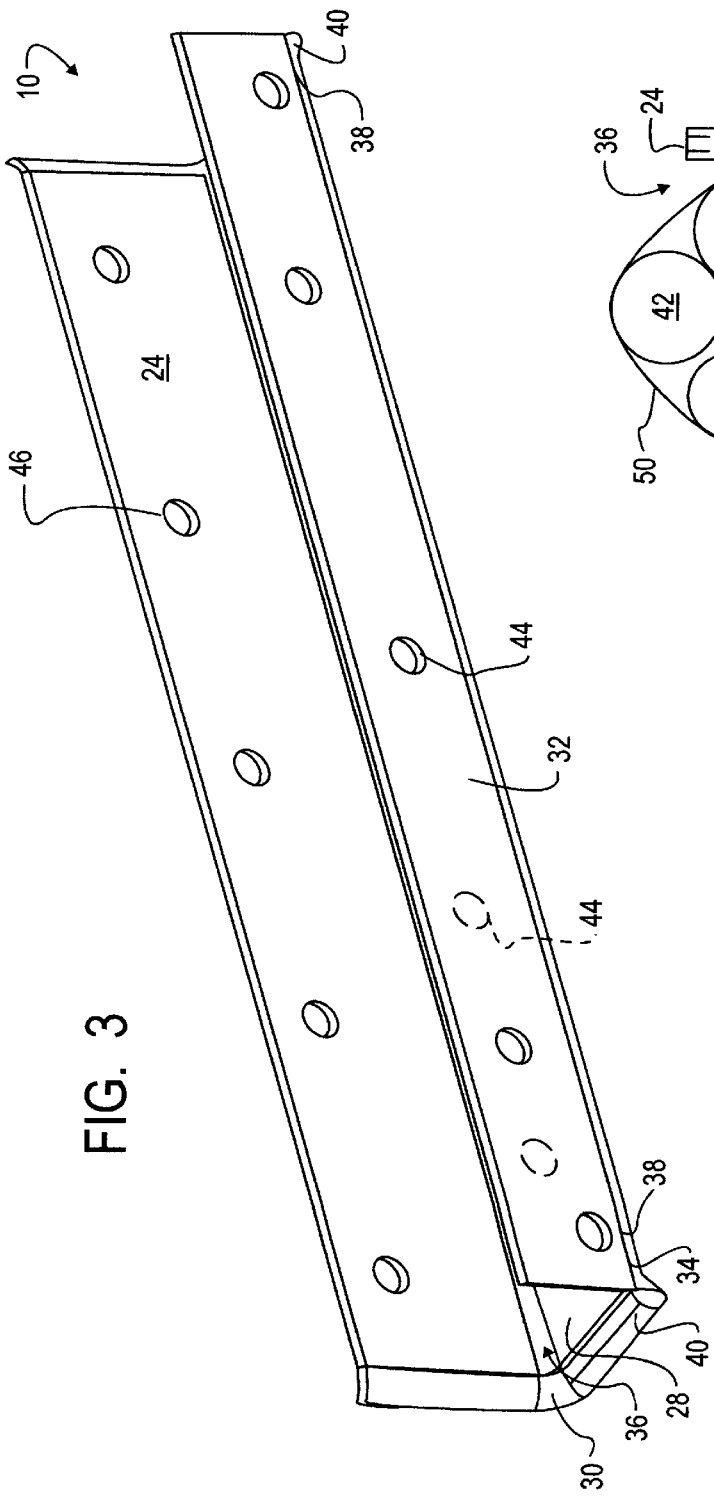
FIG. 3 is an enlarged perspective view of the containment device of the present invention.
Figure 4:
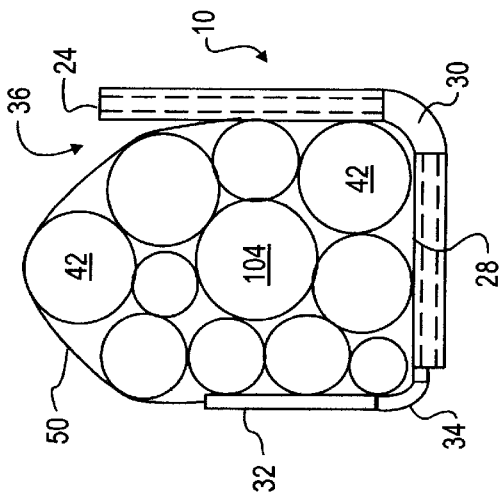
FIG. 4 is a cross sectional view through the device and shows a bundle of cables securely supported within a channel of the device.

A preferred embodiment of the cable containment device 10 is illustrated in FIG. 3 as including an upstanding wall 24 by means of which the cable containment device 10 is mounted to a vertical wall 26 of the cross member 12. A horizontal bottom wall 28 extends from a rounded bottom edge 30 of the upstanding wall 24 in a direction away from the cross member 12, such direction being forwardly as it relates to the vehicle 101 (not shown). A further upstanding wall 32 extends upwardly from a rounded terminal edge 34 of the horizontal bottom wall 28, creating a channel 36 between the upstanding walls 24 and 32 and the bottom wall 28 of the cable containment device 10.

Lateral ends 38 of the cable containment device 10 are open and incorporate radially outwardly flared edges 40 to prevent the edges 40 from potentially causing abrasion of cables 42 and air lines 104 routed through the channel 36. Such abrasion of cables 42 and air lines 104 could eventually result in failure of the cables 42 and air lines 104.

Inasmuch as the cable containment device 10 is exposed to the ambient environment, at least the bottom wall 28 is provided with drain ports 44 therein so any environmental fluids cannot accumulate within the channel 36, draining downwardly through the drain ports 44 under gravitational effect. The cable containment device 10 will be fabricated from materials resistant to corrosion such as galvanized steel.

It will be understood that the vertical extent of the cable containment device 10 is to be of such dimension as to allow for clearance between the bottom wall 28 of the cable containment device 10 and the drive shaft 20 and universal joint 22 therebeneath within minimal tolerances.

The cable containment device 10 may be secured to and along at least a center area of the vertical wall 26 of the cross member 12 by any of a plurality of industry standard fasteners 119 using mounting holes 46 provided in the upstanding wall 24 of the cable containment device 10 and cooperating mounting holes (not shown) provided in the vertical wall 26 of the cross member 12. The vertical elevation of the cable containment device 10 on the cross member 12 must be such that the minimal clearance beneath the cable containment device 10 is assured. The cable containment device 10 extends along a substantial center portion of the length of the cross member 12. The cable containment device 10 has a length just short of the length of the cross member 12 to allow cables 42 and air lines 104 being run to bend without crimping but not so short to allow sagging of cables 42 and air lines 104. In any event the length of the cable containment device 10 should be at least half as long as the distance between the side rails 14 of the truck frame 16 to prevent sagging of cables 42 and air lines 104.

The cables 42 to be routed through the channel 36 defined within the cable containment device 10 are first bundled together by use of locking straps 50, which may be locked about the bundled cables 42 in any suitable manner to accommodate securing together of any required number of cables 42. The locking straps 50 are additionally engaged to the drain ports 44 in the upstanding walls 24 and 32.

With the described configuration of the cable containment device 10, it will be understood that any realistic number of bundled together cables 42 laid within and along the channel 36 of the cable containment device 10 could be accommodated without concern for sagging of any of the cables 42 into contact with the drive shaft 20 or universal joint 22 therebeneath.

The necessity for avoidance of potential destruction of such cables 42 will become apparent when it is understood that some the air lines 104 supply air to an electronic control unit of an anti-lock brake system of the vehicle 101 (not shown) from an air tank 52 while the cables 42 are used to transfer power from batteries 54 to electrical components such as a starter 56, an air compressor 58, etc. of the vehicle 101.

As described above, the cross member 12 mounted cable containment device 10 of the present invention provides a number of advantages, some of which have been described above and others of which are inherent in the invention. Also modifications may be proposed to the cable containment device 10 without departing from the teachings herein. Accordingly, the scope of the invention is only to be limited as necessitated by the accompanying claims.

We claim:

1. A mobile vehicle, comprising:

(a) a frame with two side rails;

(b) a cross member of predetermined length bridging between said side rails;

(c) said cross member being in a position below which a forward end of a drive shaft and an universal joint engaged thereto are centered; and (d) a cable containment device engaged to said cross member, comprising:

(i) a plurality of walls, one of which being a horizontal bottom wall having drain ports therein;

(ii) said walls defining an open ended elongate channel therebetween for receiving therein a plurality of cables to be supported upon said horizontal bottom wall against sagging; and (iii) said cable containment device extending along at least a substantial portion of said length of said cross member overlying said drive shaft and said universal joint.

2. The vehicle of claim 1, wherein:

(a) said elongate channel has two lateral open ends; and (b) each said lateral open end incorporates a radially outwardly flared edge.

3. The vehicle of claim 2, wherein:

(a) said cable containment device is engaged to said cross member via mounting holes on a first upstanding wall of said walls; and (b) said first upstanding wall is fixed to said cross member by connectors extending through said mounting holes.

4. The vehicle of claim 3, wherein said cable containment device is at least half as long as the distance between said side rails of said truck frame.

5. The vehicle of claim 4, further comprising mating edges where said first and second upstanding walls meets said bottom wall with said mating edges being rounded.

6. The vehicle of claim 5 wherein said cable containment device comprising at least one locking strap for securing together said cables and air lines to be supported thereon.

7. The vehicle of claim 6 wherein said cable containment device is made of a corrosion resistant metal.

* * * * *